US008452959B2

(12) United States Patent
Brown et al.

(10) Patent No.: US 8,452,959 B2
(45) Date of Patent: May 28, 2013

(54) METHOD AND SYSTEM FOR REGISTERING A PRESENCE USER WITH A PRESENCE SERVICE

(75) Inventors: Robert William Brown, Arnprior (CA); Bruce Eric Buffam, Woodlawn (CA); Connor Patrick O'Rourke, Kanata (CA)

(73) Assignee: Research In Motion Limited, Waterloo (CA)

( * ) Notice: Subject to any disclaimer, the term of this patent is extended or adjusted under 35 U.S.C. 154(b) by 205 days.

(21) Appl. No.: 12/618,912

(22) Filed: Nov. 16, 2009

(65) Prior Publication Data

US 2010/0217982 A1  Aug. 26, 2010

Related U.S. Application Data

(60) Provisional application No. 61/155,013, filed on Feb. 24, 2009.

(51) Int. Cl.
*H04L 9/00* (2006.01)
(52) U.S. Cl.
USPC ............... 713/168; 713/169; 713/170; 726/9; 709/206

(58) Field of Classification Search
USPC ............................... 713/168, 169, 170; 726/9
See application file for complete search history.

(56) References Cited

U.S. PATENT DOCUMENTS

| 6,016,478 | A  | 1/2000 | Zhang et al. |
| 6,327,533 | B1 | 12/2001 | Chou |
| 6,442,263 | B1 | 8/2002 | Beaton et al. |
| 6,542,075 | B2 | 4/2003 | Barker et al. |
| 6,587,835 | B1 | 7/2003 | Treyz et al. |
| 6,643,701 | B1 * | 11/2003 | Aziz et al. ...................... 709/227 |
| 6,716,101 | B1 | 4/2004 | Meadows et al. |
| 6,789,078 | B2 * | 9/2004 | Saitou et al. .................... 705/72 |
| 7,035,923 | B1 * | 4/2006 | Yoakum et al. ............... 709/224 |
| 7,246,099 | B2 | 7/2007 | Feldhahn |

(Continued)

FOREIGN PATENT DOCUMENTS

| EP | 1 753 199 A1 | 2/2007 |
| WO | 02/25403 A2 | 3/2002 |

(Continued)

OTHER PUBLICATIONS

"Content-Based Routing for Publish-Subscribe on a Dynamic Topology: Concepts, Protocols, and Evaluation" Gianpaolo Cugola, Davide Frey, Amy L. Murphy, Gian Pietro Picco, Year 2006.

(Continued)

*Primary Examiner* — Jung Kim
*Assistant Examiner* — Thomas Ho
(74) *Attorney, Agent, or Firm* — Jones Day

(57) ABSTRACT

A method, performed by a registrar of a presence service, for registering a user with a presence service. The method entails negotiating a key with a client device operated by the user in order to establish an encrypted communications channel between the client device and the registrar via a proxy node, authenticating the user by exchanging messages through the encrypted communications channel and through a separate e-mail channel, binding a universally unique identifier identifying the user with one particular function node that is interposed between the proxy node and a publish-subscribe subsystem of the presence service and creating a user profile for the user and storing the user profile in a persistent data store.

8 Claims, 15 Drawing Sheets

U.S. PATENT DOCUMENTS

| | | | |
|---|---|---|---|
| 7,284,033 B2 | 10/2007 | Jhanji | |
| 7,386,878 B2 | 6/2008 | Fernando et al. | |
| 7,505,786 B2 | 3/2009 | Wennberg et al. | |
| 7,677,436 B2* | 3/2010 | Ohno et al. | 235/375 |
| 8,032,932 B2* | 10/2011 | Speyer et al. | 726/9 |
| 8,060,572 B2* | 11/2011 | Brown et al. | 709/206 |
| 8,146,142 B2* | 3/2012 | Lortz et al. | 726/6 |
| 2002/0087892 A1 | 7/2002 | Imazu | |
| 2003/0037103 A1 | 2/2003 | Salmi et al. | |
| 2004/0128151 A1 | 7/2004 | Mock et al. | |
| 2004/0267625 A1 | 12/2004 | Feng et al. | |
| 2005/0021773 A1 | 1/2005 | Shiga et al. | |
| 2006/0047782 A1* | 3/2006 | Niemi | 709/220 |
| 2006/0120281 A1* | 6/2006 | Schmidt et al. | 370/223 |
| 2006/0146997 A1* | 7/2006 | Qian et al. | 379/88.16 |
| 2007/0050840 A1* | 3/2007 | Grandcolas et al. | 726/5 |
| 2007/0136197 A1 | 6/2007 | Morris | |
| 2007/0136800 A1* | 6/2007 | Chan et al. | 726/10 |
| 2007/0182541 A1 | 8/2007 | Harris et al. | |
| 2008/0028211 A1 | 1/2008 | Tanizawa | |
| 2008/0089488 A1 | 4/2008 | Brunson et al. | |
| 2008/0108332 A1 | 5/2008 | Tian et al. | |
| 2008/0205655 A1 | 8/2008 | Wilkins et al. | |
| 2008/0208953 A1 | 8/2008 | Tian | |
| 2008/0235230 A1 | 9/2008 | Maes | |
| 2008/0285542 A1 | 11/2008 | Jachner | |
| 2009/0010163 A1 | 1/2009 | Isomura et al. | |
| 2009/0022286 A1 | 1/2009 | Brunson et al. | |
| 2009/0022287 A1 | 1/2009 | Brunson et al. | |
| 2009/0022288 A1 | 1/2009 | Brunson et al. | |
| 2009/0022289 A1 | 1/2009 | Brunson et al. | |
| 2009/0028303 A1 | 1/2009 | Brunson et al. | |
| 2009/0049149 A1 | 2/2009 | Cheah | |
| 2009/0049190 A1 | 2/2009 | Jiang et al. | |
| 2009/0063643 A1 | 3/2009 | Setiawan et al. | |
| 2009/0063676 A1 | 3/2009 | Oh et al. | |
| 2009/0066510 A1 | 3/2009 | Kamdar et al. | |
| 2009/0070410 A1 | 3/2009 | Gilfix et al. | |
| 2009/0070419 A1 | 3/2009 | Gilfix et al. | |
| 2009/0077584 A1 | 3/2009 | Glasgow et al. | |
| 2009/0300095 A1 | 12/2009 | Bouchard et al. | |
| 2010/0030643 A1 | 2/2010 | Sion | |

FOREIGN PATENT DOCUMENTS

| | | |
|---|---|---|
| WO | 2006072817 A1 | 7/2006 |
| WO | 2007061946 A2 | 5/2007 |
| WO | 2008/020705 A1 | 2/2008 |
| WO | 2008073009 A1 | 6/2008 |
| WO | 2008/120901 A1 | 10/2008 |
| WO | 2008/152586 A2 | 12/2008 |

OTHER PUBLICATIONS

"Efficient Content-Based Event Dispatching in the Presence of Topological Reconfiguration" Gianpaolo Cugola, Amy L. Murphy (2003) In Proceedings of the 23rd International Conference on Distributed Computing Systems (ICDCS03).

"Semi-Probabilistic Content-Based Publish-Subscribe" Paolo Costa, Gian Pietro Picco (2005) In Proceedings of the 25th International Conference on Distributed Computing Systems (ICDCS05).

"Bloom Filter Based Routing for Content-Based Publish/Subscribe" Zbigniew Jerzak et al. (2008) In Proceedings of the 2nd International Conference no Distributed Event-Based Systems—Rome, Italy.

"Scalable Security and Accounting Services for content-based Publish/Subscribe Systems" Himanshi Khurana, Radostina Koleva (2005) In Proceedings Symposium on Applied Computing.

"Achieving Scalability and Expressiveness in an Internet-Scale Event Notification Service" Antonio Carzaniga (2000) In Proceedings of the 19th Annual ACM Symposium on Principles of Distributed Computing.

"Content-Based Networking: A New Communication Infrastructure" Antonio Carzaniga, Er L. Wolf (2001) In NSF Workshop on an Infrastructure for Mobile and Wireless Systems.

"Publish/Subscribe Tree Construction in Wireless Ad-Hoc Networks" Yongqiang Huang, Hector Garcia-Molina In 4th International Conference on Mobile Data Management (MDM 2003), vol. 2574 of LNCS.

"Content-Based Dispatching in a Mobile Environment" Gianpaolo Cugola, Elisabetta Di Nitto, Gian Pietro Picco in Proceedings of WSDAAL 2000.

"Minimizing the Reconfiguration Overhead in Content-Based Publish-Subscribe" Gianpaolo Cugola, Davide Frey, Amy L. Murphy, Gian Pietro Picco In Proceedings of the ACM Symposium on Applied Computing (SAC) 2004.

"Modelling the Communication Costs of Content-Based Routing: The Case of Subscription Forwarding" Stefano Castelli, Paolo Costa (2007) In Proceedings of the 1st International Conference on Distributed Event-Based Systems.

"HyperCBR: Large-Scale Content-Based Routing in Multidimensional Space" Stefano Castelli, Year 2008.

"Epidemic Algorithms for Reliable Content-Based Publish-Subscribe: An Evaluation" Paulo Costa, Matted Migliavacca, Gian Pietro Picco, Gianpaolo Cugola (2004) In Proceedings of the 24th International Conference no Distributed Computing Systems (ICDCS04).

"Exactly-Once Delivery in a Content-Based Publish-Subscribe System" Sumeer Bhola, Robert Strom, Saurabh Bagchi, Yuanyuan Zhao, Joshua Auerbach (2002).

"Introducing Reliability in Content-Based Publish-Subscribe Through Epidemic Algorithms" Paolo Costa, Matted Migliavacca, Gian Pietro Picco, Gianpaolo Cugola (2003) In Proceedings of the 2nd International Workshop on Distributed Event-Based Systems.

"Self-Organized Publish/Subscribe" Michael A. Jaeger (2005) In Proceedings of the 2nd International Doctoral Symposium on Middleware (DSM05).

CIPO: Requisition by the Examiner (office action) dated Apr. 16, 2012 for Application No. 2,692,755 (3 pages).

USPTO: Office Action dated Apr. 16, 2012 for U.S. Appl. No. 12/619,080 (21 pages).

USPTO: Office Action dated Mar. 20, 2012 for U.S. Appl. No. 12/618,875 (41 pages).

"A Review of the Diffie-Hellman Algorithm and its Use in Secure Internet Protocols" SANS Institute InfoSec Reading Room, Nov. 5, 2001, XP002575072, Retrieved from the Internet:URL:http://www.sans.org/reading_room/whitepapers/vpns/a_review_of_the_diffiehellman_algorithm_and_its_use_in_secure_internet_protocols_751> [Retrieved on Mar. 25, 2010].

EPO: Extended European Search Report, Application No. 09176032.2-2413, Jul. 7, 2010 (6 pages).

EPO: Extended European Search Report, Application No. 09176033.0-2413, May 10, 2010 (6 pages).

EPO: Communication pursuant to Article 94(3) EPC, Application No. 09 176 033.0-2413, Oct. 12, 2010 (4 pages).

Prati L et al: "XDMS—Network Address Book enabler" IP Multimedia Subsystem Architecture and Applications, 2007 International Conference on, IEEE, Piscataway, NJ, USA, Dec. 6, 2007, pp. 1-4, XP031283339 ISBN: 978-1-4244-2671-3.

EPO: Extended European Search Report, Application No. 09176035.5-2413, Jul. 12, 1010 (6 pages).

EPO: Communication pursuant to Article 94(3) EPC, Application No. 09 176 035.5-2413, Feb. 17, 2011 (4 pages).

CIPO: PCT Written Opinion of the International Searching Authority with International Search Report, Application PCT/CA2010/000177, May 5, 2010 (8 pages).

Peterson et al.: "Enhancements for Authentication Identity Management in the Session Initiation Protocol (SIP)", IETF Network Working Group RFC 4474, Aug. 2006 (34 pages).

EPO: Communication pursuant to Article 94(3) EPC, Application No. 09 176 033.0-2413, Apr. 13, 2011 (5 pages).

EPO: Communication pursuant to Article 94(3) EPC, Application No. 09 176 032.2-2413, Jul. 28, 2011 (5 pages).

USPTO: Office Action dated Nov. 10, 2011 in U.S. Appl. No. 12/619,080 (37 pages).

EPO: Communication pursuant to Article 94(3) EPC, Application No. 09 176 034.8-2413, Nov. 21, 2011 (5 pages).

CIPO: Requisition by the Examiner (office action) dated Jan. 24, 2012 for Application No. 2,692,747 (3 pages).

* cited by examiner

METHOD AND SYSTEM FOR REGISTERING A PRESENCE USER WITH A PRESENCE SERVICE

CROSS-REFERENCE TO RELATED APPLICATIONS

This application claims priority from U.S. Provisional Patent Application Ser. No. 61/155,013 entitled METHOD AND SYSTEM FOR COLLECTING, MANAGING AND DISSEMINATING PRESENCE INFORMATION, which was filed Feb. 24, 2009.

TECHNICAL FIELD

The present technology relates generally to telecommunications and, in particular, to the collection, management and dissemination of presence information.

BACKGROUND

In telecommunications, presence information indicates the ability, availability and willingness of a person to communicate. A person's presence information provides contextual information to help others decide if they should try to contact the user and which mode of communication would be most appropriate at that time.

Presence is currently one of the key drivers behind instant messaging (IM) and some of the recent developments in VoIP technology, in particular Session Initiation Protocol (SIP). While these and other rudimentary presence technologies have been implemented and discussed (see, e.g., the IETF's RFC 2778 entitled "A Model for Presence and Instant Messaging" and RFC 4480 entitled "RPID: Rich Presence Extensions to the Presence Information Data Format (PIDF)"), these technologies are still generally quite embryonic. These prior-art technologies provide limited flexibility, scalability, security and privacy. Accordingly, improvements in the manner in which presence information is collected, managed and disseminated remain highly desirable. Techniques that improve the ease and efficiency with which devices may register and interact with the presence system also remain highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
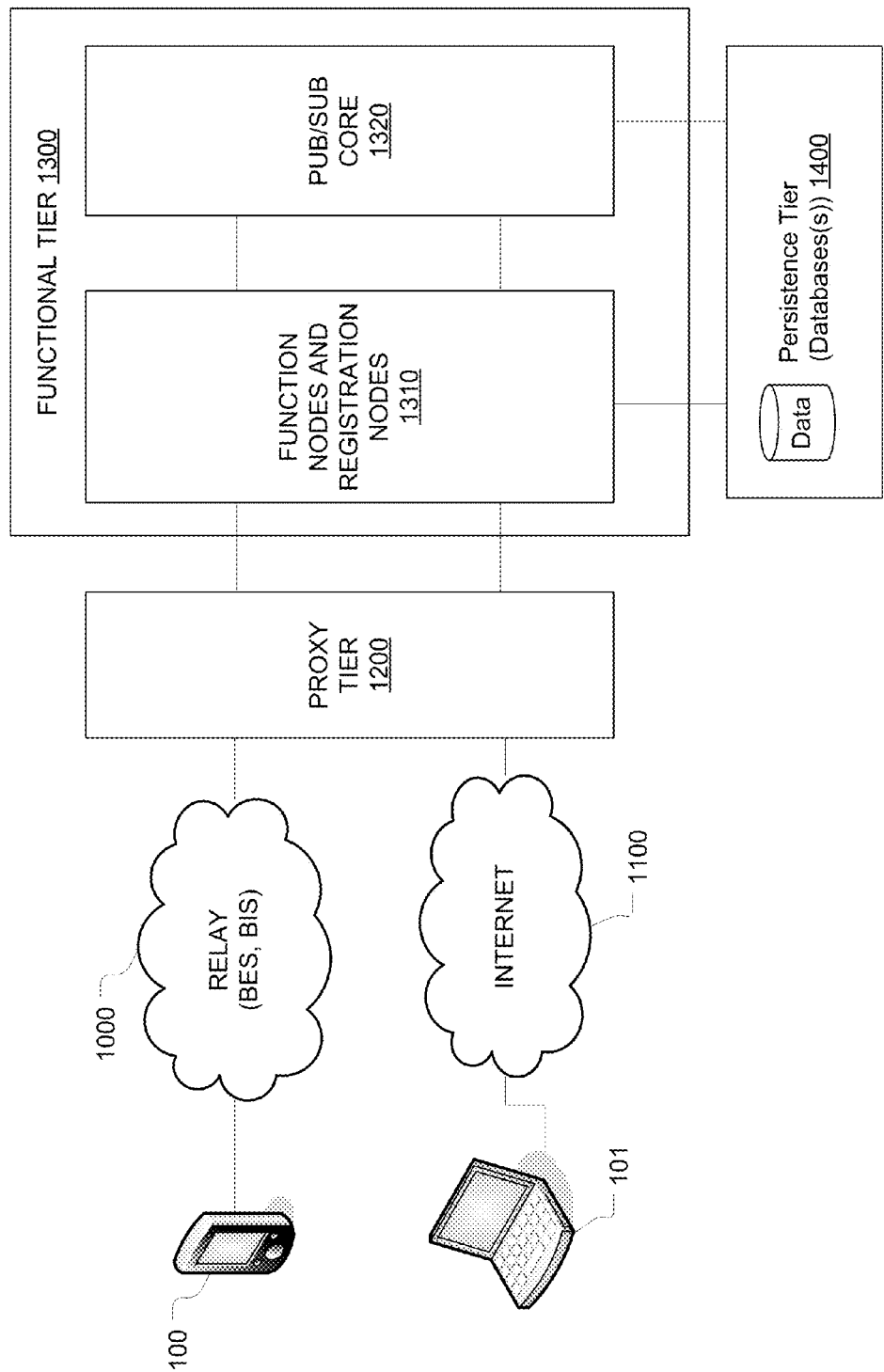
FIG. 1 schematically depicts, by way of general overview, the architecture of the presence system in accordance with main implementations of the present technology.

In general, the present technology provides novel techniques for registering and re-registering a client device with a presence service and for maintaining the user's registration with the presence service even when the user switches to a new device or adopts a new e-mail address.

One main aspect of the present technology is a method of registering with a presence system. The method, performed by a wireless communications device, entails negotiating a key with a registrar in order to establish an encrypted communications channel between a client device and the registrar via a proxy node. The method further involves authenticating the user with the registrar by exchanging messages through the encrypted communications channel and through a separate e-mail channel to thereby enable the registrar to create a user profile for the user and to bind the client device with one particular function node of the presence service for subsequently exchanging presence data.

Another main aspect of the present technology is a wireless communications device for registering with a presence service. The device includes a processor coupled to memory for executing a presence registration client, the presence registration client being programmed to interact with a radiofrequency transceiver on the device to negotiate a key with a registrar of the presence service in order to establish an encrypted communications channel between the device and the registrar and authenticate a user of the device with the registrar by exchanging messages through the encrypted communications channel and through a separate e-mail channel to thereby enable the registrar to create a user profile for the user and to bind the client device with one particular function node of the presence service for subsequently exchanging presence data.

Another main aspect of the present technology is a machine-readable medium comprising code which when loaded into memory and executed on a processor of a wireless communications device is programmed to cause the device to negotiate a key with a registrar of the presence service in order to establish an encrypted communications channel between the device and the registrar and authenticate a user of the device with the registrar by exchanging messages through the encrypted communications channel and through a separate e-mail channel to thereby enable the registrar to create a user profile for the user and to bind the client device with one particular function node of the presence service for subsequently exchanging presence data. This machine-readable medium, when loaded onto a device, may constitute a presence registration client application.

Yet another main aspect of the present technology is a method, performed by a registrar of a presence service, for registering a user with a presence service. The method entails negotiating a key with a client device operated by the user in order to establish an encrypted communications channel between the client device and the registrar via a proxy node, authenticating the user by exchanging messages through the encrypted communications channel and through a separate e-mail channel, binding a universally unique identifier identifying the user with one particular function node that is interposed between the proxy node and a publish-subscribe subsystem of the presence service, and creating a user profile for the user and storing the user profile in a persistent data store.

Yet another main aspect of the present technology is a registration server acting as a registrar for registering a user with a presence system. The registration server comprises a first communication channel linked to a proxy node for negotiating a key with the client device and for exchange token request and token response messages, a second communication channel linked to an e-mail server for communicating an e-mail token response to the client device, a third communication channel for communicating with a presence function node for binding a universally unique identifier assigned to the client device with the function node for subsequent presence messaging, and a fourth communication channel for communicating with a persistent data store for storing a user profile at the persistent data store.

Overview of Presence System

These novel registration-related techniques enable the user to interact efficiently and easily with a content-based presence service such as the one depicted by way of example in FIGS. 1-4. As depicted in these introductory figures, a wireless communications device 100 or wired computing device 101 may interact with the presence service via a relay 1000 (or any equivalent mobile network infrastructure) or via the Internet 1100, respectively. As illustrated, the presence system that provides the presence service includes a proxy tier 1200, a function tier 1300 and a persistence tier 1400.

The proxy tier 1200 includes a plurality of proxy nodes. The proxy nodes act as routers to route messages from the clients 100, 101 to a predetermined (pre-assigned) function node of the functional tier 1300.

The function tier 1300 includes a plurality of function nodes 1310 and at least one registration node 1312. The function nodes process messages from presence clients to determine whether the messages pertain to registration, publication or subscription. The function tier 1300 also includes a publish-subscribe subsystem or publish-subscribe router 1320 (and also known herein as a publication-subscription server or "pub-sub core"). The publish-subscribe router 1330 stores published data content and compares the published data content with subscription expressions received from the second presence client. The publish-subscribe subsystem 1330 communicates presence information about a first user to a second user when content defined by subscription expressions provided by the second user matches published data content provided by the first user.

The persistence tier 1400 includes at least one database running on a server, cluster of servers or distributed network of servers. This persistent data store is used for storing any invariable user identification data and for storing a mapping that links each user (via, e.g., a universally unique ID) to each device (via, e.g. a mobile device identifier number associated with the device such as, for example, a device PIN, an International Mobile Equipment Identity (IMEI) number which uniquely identifies a GSM, UMTS, or iDEN mobile device or a Mobile Equipment Identifier (MEID) which uniquely identifies a CDMA mobile device).

Such a presence service enables data content representing presence information to be published and stored in any arbitrary data format. Authorized watchers can thus subscribe to the presence information, or to specific elements of the presence information ("attributes" such as location, mood, activity, availability, etc.) by simply specifying subscriptions expressions in terms of content. For example, a subscription expression <Contact1, location="Ottawa") would notify the user when Contact1 is in Ottawa. This content-based approach to presence enables data content to be published in any format and enables subscriptions to be defined in terms of the content that is sought or desired.

While it is advantageous to implement the presence system in the manner illustrated in these introductory figures, i.e. with proxy nodes decoupled from function nodes and with function nodes decoupled from the pub-sub core, it is also possible to combine one or more of the nodes depicted in this figure into one or more multi-functional nodes. It should also be appreciated that the additional (backup) nodes may be inserted to provide network redundancy and resiliency.

Figure 5:
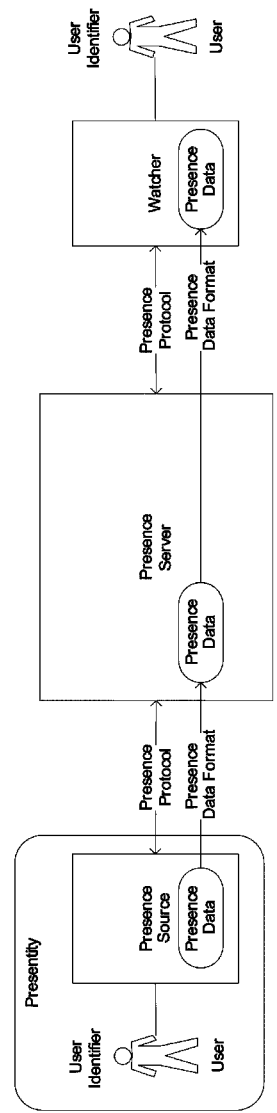
FIG. 5 schematically depicts the relationship among the basic conceptual elements of the presence system, namely the presentity, the presence sever and the watcher.

FIG. 5 schematically depicts the relationship among the basic elements of the presence system, namely the user, presence server and Presentity. As depicted schematically in this figure, the Presentity includes a first user characterized by a first user identifier and a presence source (i.e. a first presence client) for generating presence data about the user. The "Presentity" thus combines devices, services and personal information for a complete picture of a user's presence status. This presence data is communicated using a presence protocol to a presence server which, in turn, shares this presence data with a watcher (i.e. a second presence client associated with a second user). In this simple unilateral scenario, the first user is thus a supplier or provider of presence data while the second user (watcher) is a consumer of the presence data. In a bilateral scenario, the first user would also receive presence data about the second user. The sharing of presence data may be symmetrical where both exchange the same types of presence data or asymmetrical where one user consumes more presence data than the other, or one user supplies more presence data than the other.

Accordingly, for the purposes of this specification, the expression "presence information" refers to a set of information that conveys ability, availability, willingness for various modes of communication (e.g. e-mail, voice, SMS, MMS, IM), for various services and various devices. Presence information usually contains specific, unambiguous states such as available/unavailable; however, it may also contain ambiguous or subtle information such as mood, place or activity.

Figure 2:
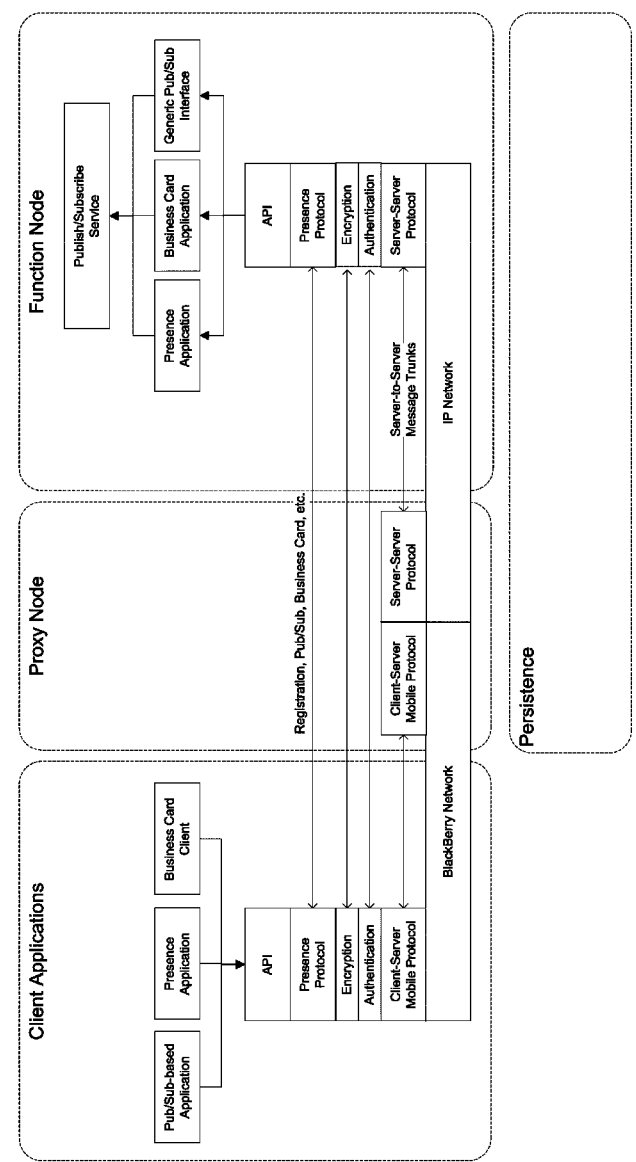
FIG. 2 presents, in a protocol stack diagram, the interactions between the client applications, the proxy node and function node.

As shown in FIG. 2, the presence service may employ a special presence protocol, i.e. an application-layer protocol that can be transported over the existing network using a suitable transport protocol or wireless transport protocol. This presence protocol depends upon underlying transport layers such as TCP/IP only for basic message delivery services. It is not dependent upon the specifics of transport layer addressing, routing or network topologies.

Figure 3:
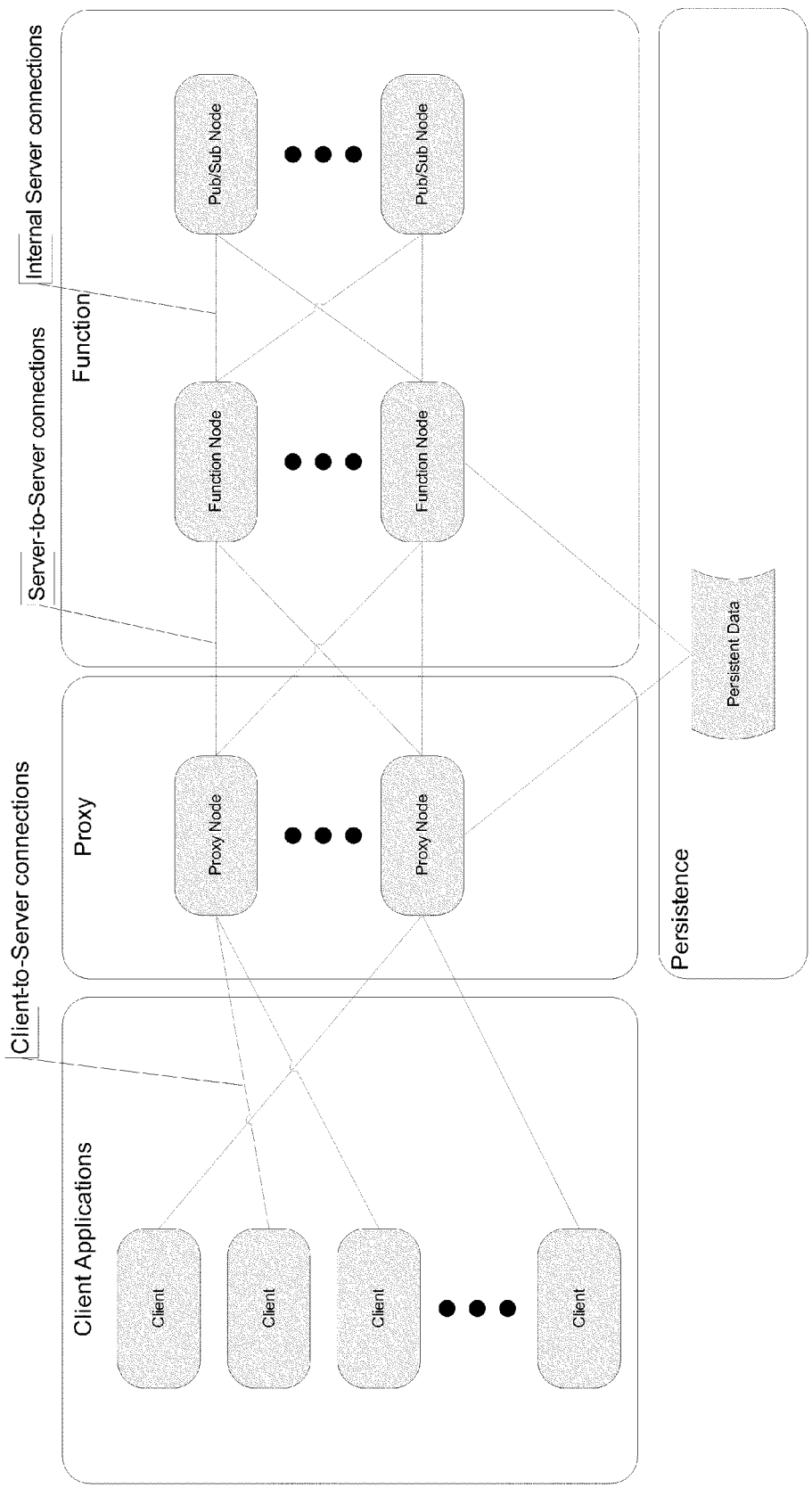
FIG. 3 presents the topology of one implementation of the presence system.
Figure 4:
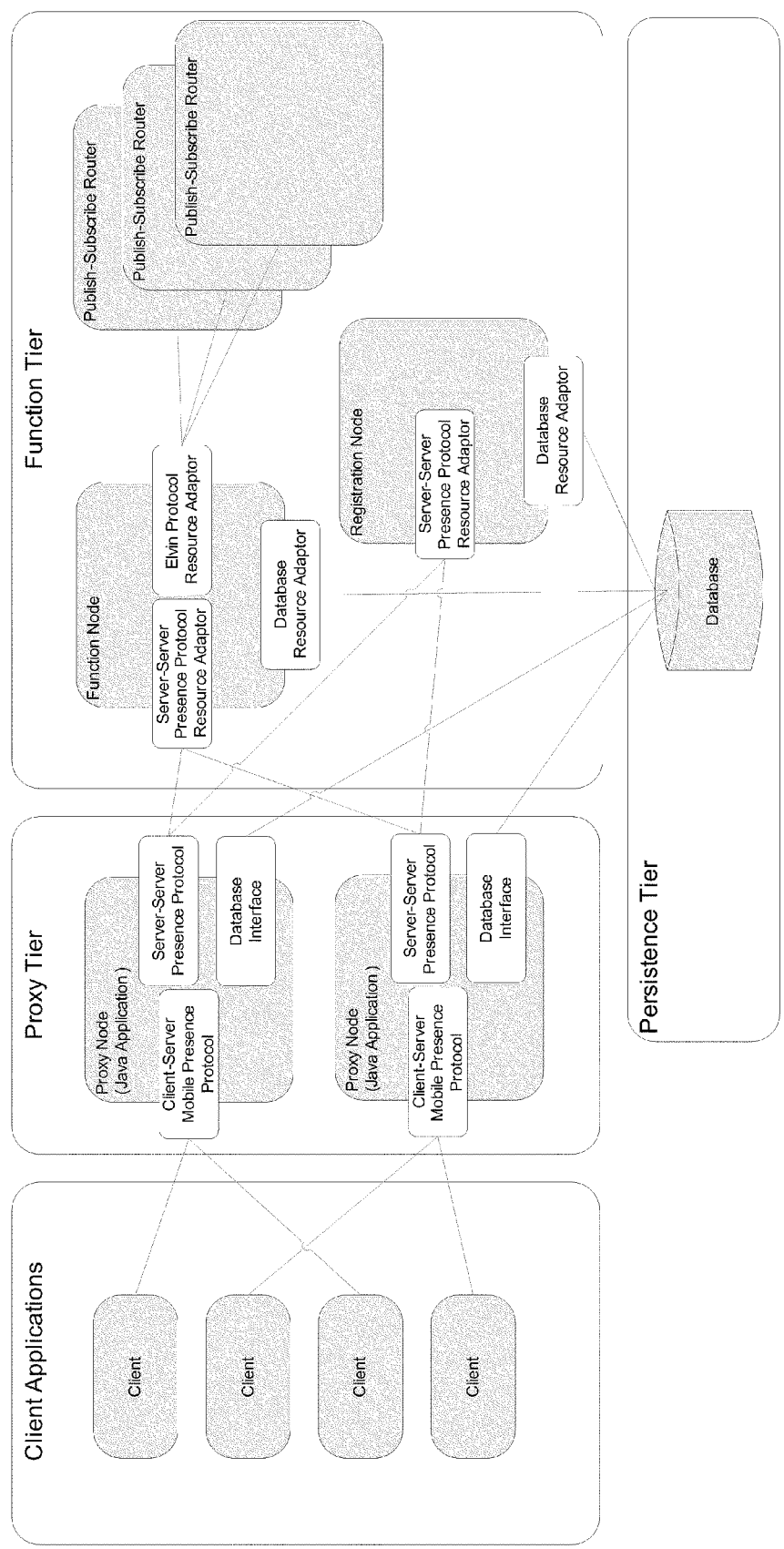
FIG. 4 presents a schematic view of one implementation of the presence system, depicting interactions amongst the client applications, proxy nodes, function node, registration node, publish-subscribe routers and the database of the persistence tier.

As depicted in FIGS. 2-4, messages sent from a client to the presence service are routed by a proxy node to the appropriate function node in the function tier based upon the identity of the client and the specific application identified in the message. The specific application may be identified by a message category contained in the message. Messages sent from the presence service to a client are routed by a proxy node based upon the universally unique identifier (UUID) contained in the message.

Applications such as registration, publication, subscription/notification and peer-to-peer communication are independent of each other within the presence protocol layer. Routing of messages is thus independent and distinct for each application. Accordingly, any messages having the message category "registration" are routed by the proxy node directly and automatically to the registration node.

Registration

In general, registration is a synchronous process that involves the exchange of request-response messages between a presence client (or a distinct presence registration client) and the presence service registrar (which may be disposed at one or more registration nodes). In addition to the request-response messages exchanged through the proxy node, there is one message that is sent through e-mail to the presence client to verify ownership of the selected user identifier e-mail address. This special e-mail message contains only an authentication token as an attachment, as will be elaborated below. In one specific implementation, each registration message has an eight-byte fixed-length registration session identifier field followed by a single TLV command field where TLV refers to a command encoded using a Type-Length-Value format.

Figure 6:
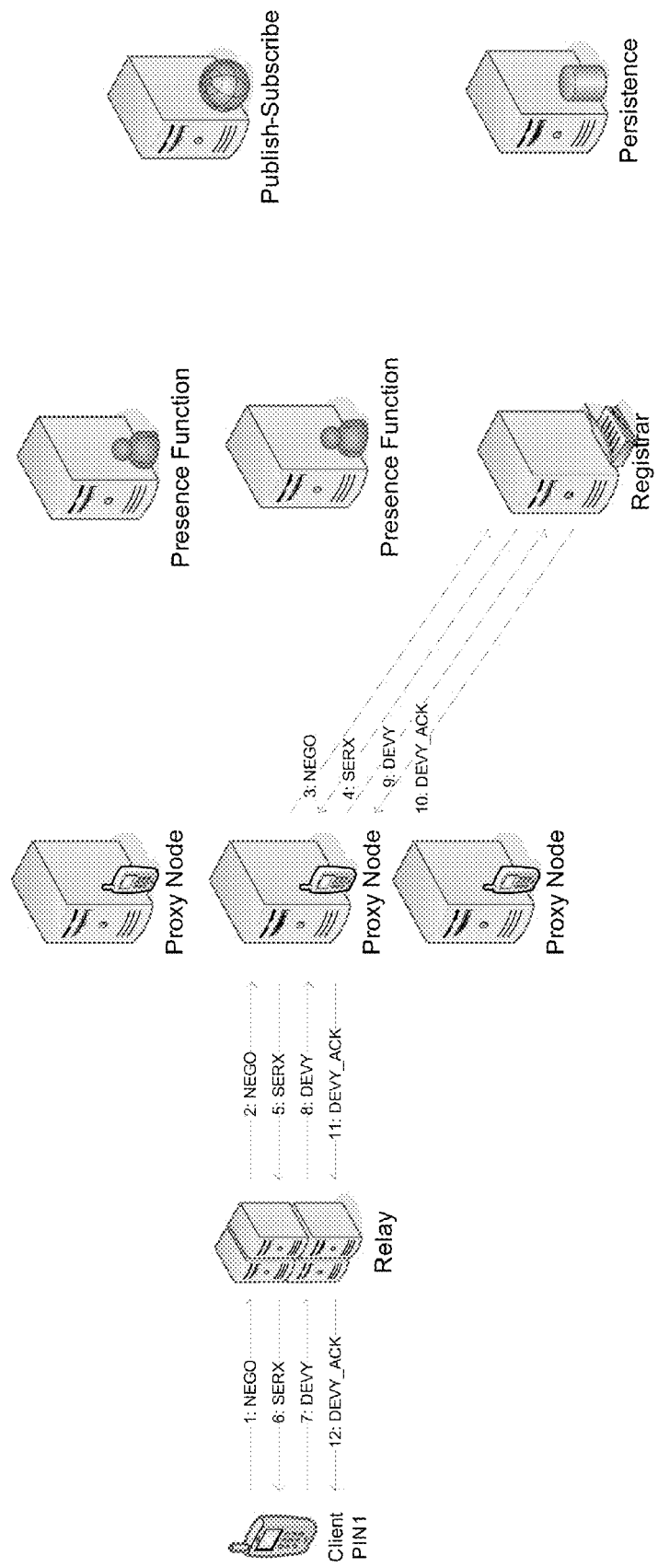
FIG. 6 schematically depicts a client-server key negotiation as part of a first phase of the presence registration procedure.
Figure 7:
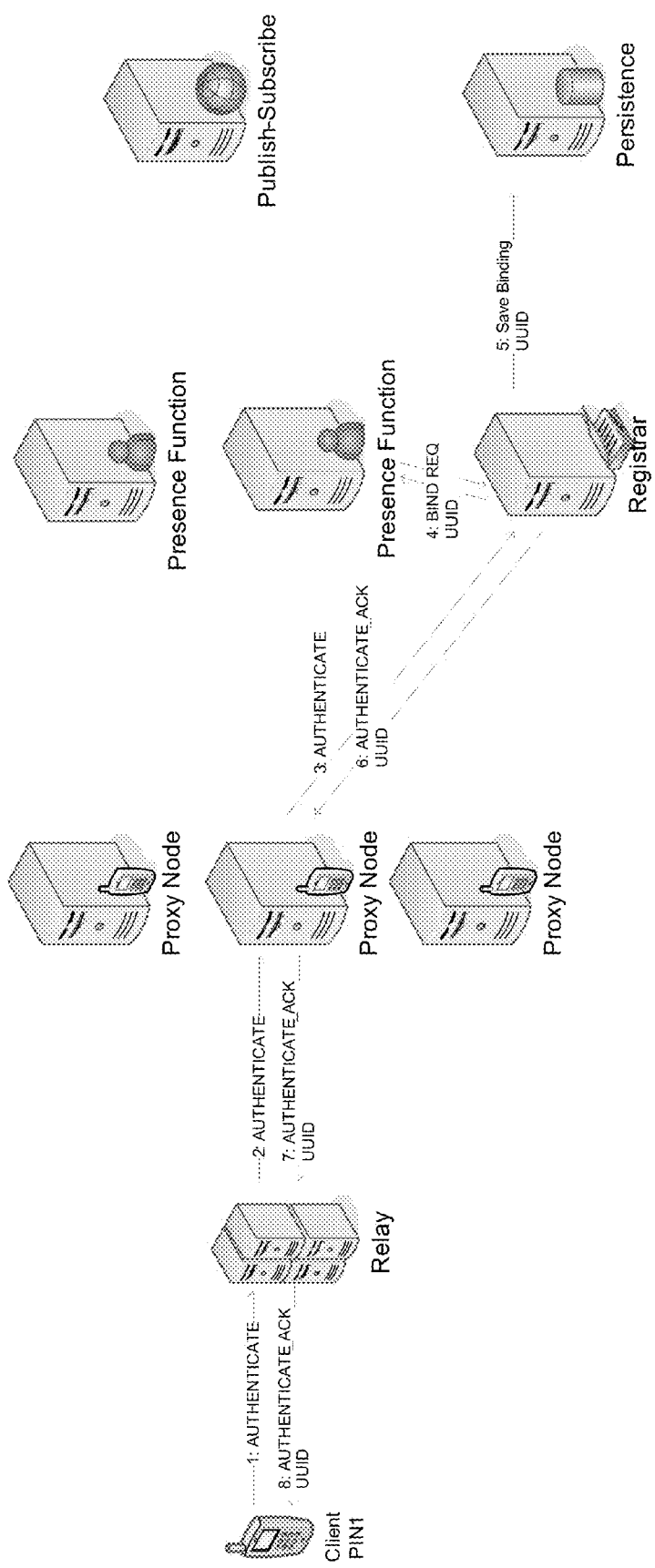
FIG. 7 schematically depicts the authentication of the user as part of a second phase of the presence registration procedure.

The method registration entails two phases: a first key negotiation phase which is presented in FIG. 6 followed by a second authentication phase which is presented in FIG. 7.

FIG. 6 schematically depicts a client-server key negotiation as part of the presence registration procedure. This figure illustrates, by way of example, the key negotiation phase of the presence registration procedure. The presence client sends the first NEGO message inside a transport layer message addressed to the service identifier of the presence service. The mobile network infrastructure (e.g. relay) forwards this message to the service identifier of one of the proxy nodes. The selected proxy node removes the transport protocol headers, inspects the message category and forwards the message to a presence registrar node. All subsequent messages related to the client registration session follow the same path between the presence client and the presence registrar.

Upon completion of the key negotiation phase, the presence client and the presence registrar will have established a trusted, encrypted communications channel. This can be accomplished using, for example, the Diffie-Hellman (DH) key exchange.

FIG. 7 schematically depicts how a user identifier is selected and authenticated as a second phase of the presence registration procedure. This figure illustrates, by way of example, the selection and authentication of the user identifier as the second phase of the presence registration procedure.

The procedure is initiated when the user's device sends a token request message [1:TOKEN_REQUEST] to the presence registrar. This message contains an identifier, typically an e-mail address, selected by the user. To verify that the user actually owns the identifier, the presence registrar sends a token response message [4a:TOKEN_RESPONSE_user] to the presence client using the presence protocol and also sends a token response e-mail message [4b:TOKEN_RESPONSE_email] to the presence client. These token response messages may be sent substantially concurrently or in close succession. In the specific example depicted in this figure, the token response e-mail message is routed through an e-mail server, an enterprise server and a relay which delivers the e-mail to the device. These two token response messages [6a:TOKEN_RESPONSE_user] and [7b:TOKEN_RESPONSE_email] each contain unique security material. The presence client combines the unique security material from each of these token response messages and returns this combined security material back to the presence registrar in, e.g., an authentication message [8:AUTHENTICATE] to prove ownership of the e-mail identifier. Other authentication techniques may be used in lieu of, or in addition to, the procedure described above.

Upon successful authentication of the user's identifier, the presence registrar performs a lookup [11:Lookup] to determine if the user is a new registrant or if the user has previously registered with the presence service. In this example scenario the user is assumed to be a new registrant. In that case, the presence registrar generates a new Universally Unique Identifier (UUID) for the user and establishes a binding for the user with a function node by sending a binding request for the given UUID [12:BIND_REQ]. The registrar then adds the user's profile (UUID, e-mail address, PIN, and function node binding) to the persistent data store by sending an add user message [13:Add User].

As shown, the final steps of this presence registration procedure involve sending an authentication acknowledgement [14:AUTHENTICATE_ACK] from the registrar to the proxy node. The acknowledgement message contains the user's newly generated UUID. The proxy node forwards the authentication acknowledgement [15:AUTHENTICATE_ACK] to the relay which, in turn, communicates the authentication acknowledgement [16:AUTHENTICATE_ACK] to the presence client on the device to acknowledge successful registration with the presence service. As such, the newly created UUID is delivered to the device as part of the authentication acknowledgement.

Figure 8:
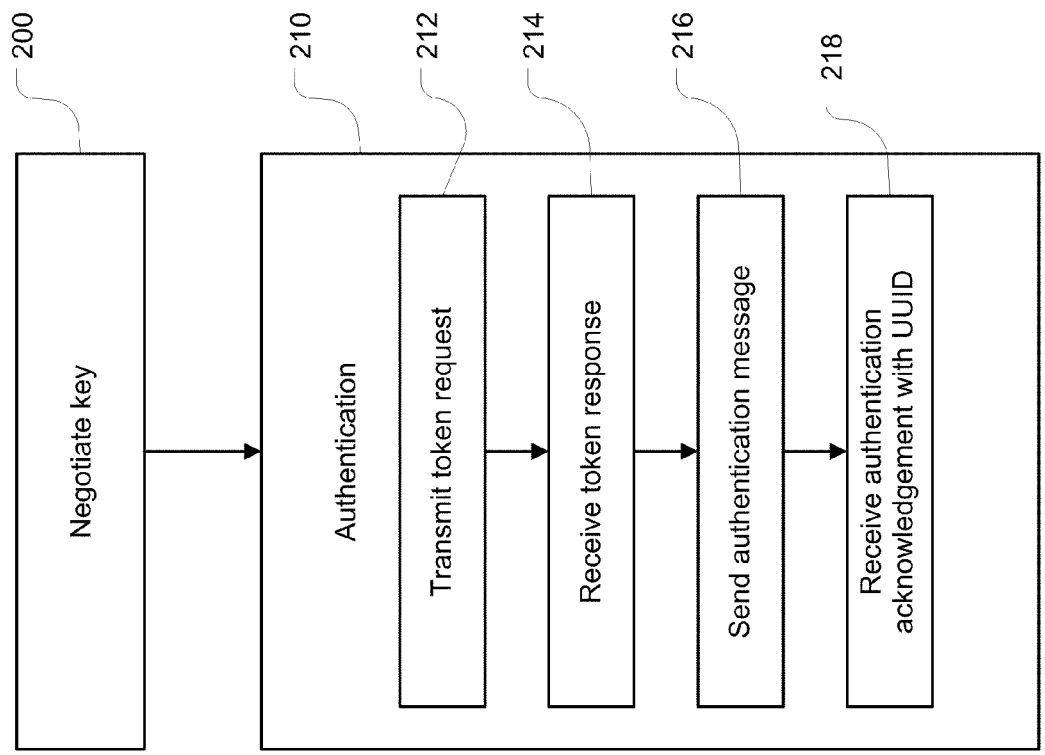
FIG. 8 is a flowchart depicting main steps of a registration method performed by the client device.

Upon completion of this phase the user is registered with the presence service. The following has thus been accomplished:

the UUID has been generated and assigned to the user the user's e-mail address and mobile device identifier have been associated with the UUID a binding with a specific function node has been established a user profile (identifying the e-mail address, PIN and functional node binding for the newly created UUID) has been created in the persistent data store Accordingly, with reference to the flowchart presented in FIG. 8, the registration method performed by the device comprises a first step 200 of negotiating a key with a registrar in order to establish an encrypted communications channel between a client device and the registrar via a proxy node. The registration method subsequently entails a second step 210 of authenticating the user with the registrar by exchanging messages through the encrypted communications channel and through a separate e-mail channel to thereby enable the registrar to create a user profile for the user and to bind the client device with one particular function node of the presence service for subsequently exchanging presence data.

As depicted in FIG. 8, the authentication step may be accomplished by transmitting (step 212) to the registrar from the client device a token request with an e-mail address associated with the client device as a user identifier, receiving (step 214) a token response from the registrar via the encrypted communications channel while separately receiving an e-mail token via the separate e-mail channel, sending (step 216) the e-mail token back to the registrar through the encrypted communications channel to authenticate the e-mail address as belonging to the user, and receiving (step 218) via the encrypted communications channel an authentication acknowledgement from the registrar containing a universally unique identifier (UUID).

Figure 9:
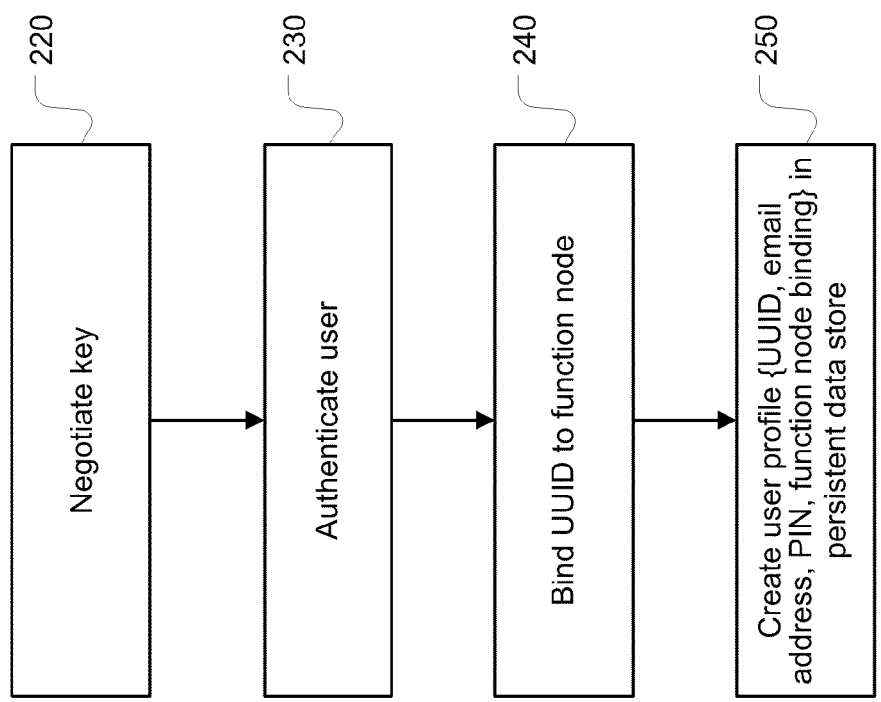
FIG. 9 is a flowchart depicting main steps of a registration method performed by the registrar.

Alternatively, from the perspective of the registrar, the registration method may be summarized (with reference to the flowchart presented in FIG. 9) as involving a step 220 of negotiating a key with a client device operated by the user in order to establish an encrypted communications channel between the client device and the registrar via a proxy node, a step 230 of authenticating the user by exchanging messages through the encrypted communications channel and through a separate e-mail channel, a step 240 of binding a universally unique identifier identifying the user with one particular function node that is interposed between the proxy node and a publish-subscribe subsystem of the presence service and a step 250 of creating a user profile for the user and storing the user profile in a persistent data store.

In main implementations of this technology, the presence system has a distinct registration node (or registration server or registrar) that performs the registration described above. It is possible, however, to incorporate this registration server within a node (server or server cluster) that performs other functions in the system. Referring to FIG. 7, the registration server has a first communication channel linked to a proxy node for negotiating a key with the client device and for exchange token request and token response messages. It is over this link that token request, token response, authentication and authentication acknowledgement messages are carried as shown in FIG. 7. The registration server (registrar) also has a second communication channel linked to an e-mail server for communicating an e-mail token response [4b: TOKEN_RESPONSE_email] to the client device. The registration server has a third communication channel for communicating with a presence function node for binding a universally unique identifier (UUID) assigned to the client device with the function node for subsequent presence messaging. This link carries the binding request message [12: BIND REQ UUID]. Finally, this registration server (registrar) has a fourth communication channel for communicating with a persistent data store. It is over this fourth communication channel that the registrar performs the lookup of the mobile device identifier (e.g. PIN) and e-mail address (step 11 in FIG. 7). It is also over this fourth communication channel that the registrar communicates the data to add a user profile to the persistent data store (step 13 in FIG. 7).

Changing the User Identifier

Figure 10:
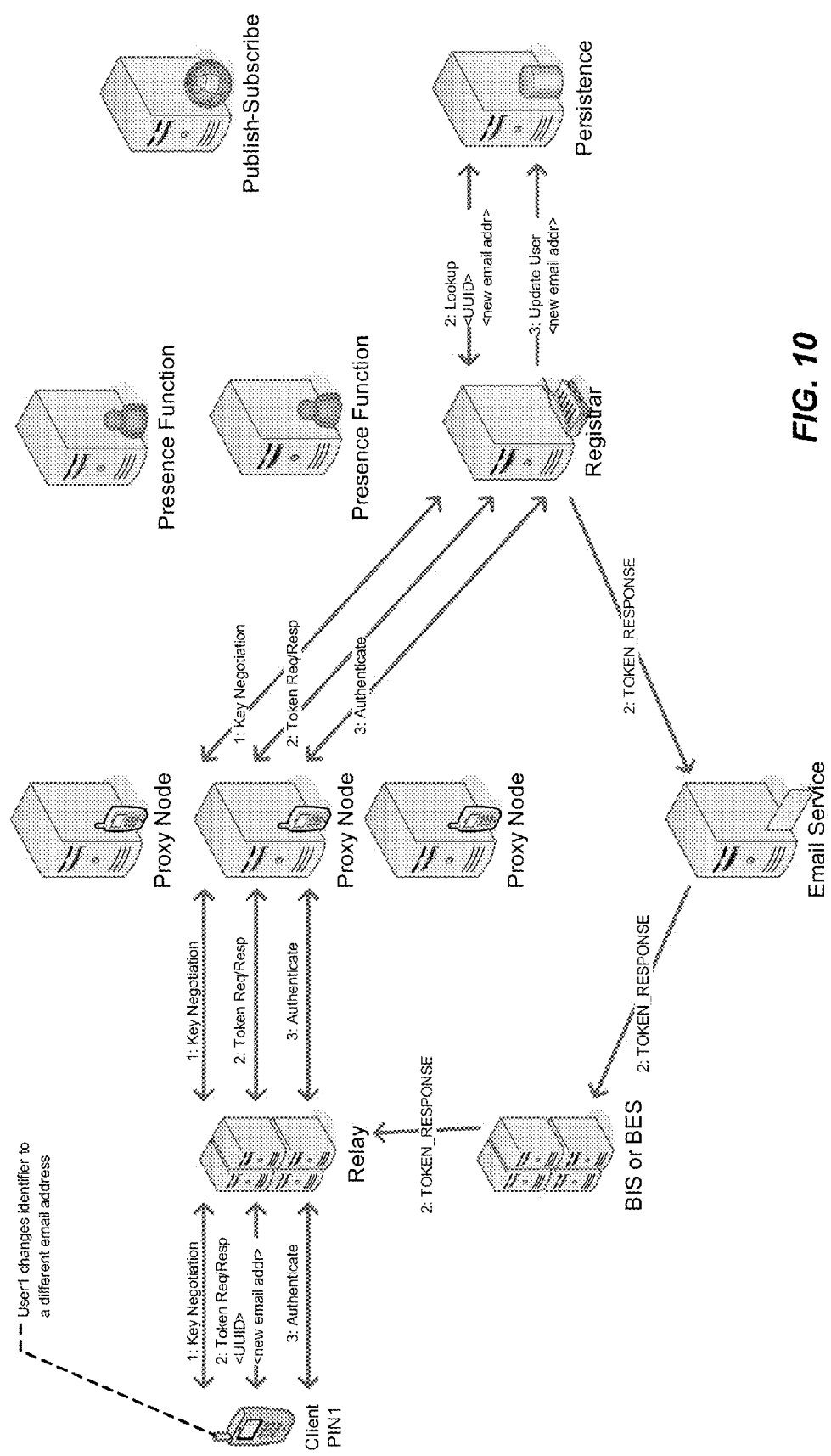
FIG. 10 schematically depicts how the registration is maintained even after the user changes the e-mail address that is employed as the user identifier.

FIG. 10 schematically depicts how a user identifier (e.g. an e-mail address) can be changed. This scenario illustrates the procedure that is run when a user decides to change his or her user identifier to a different e-mail address. The procedure is similar to the presence registration procedure described above but differs slightly in that the presence client is already known to the presence service. Accordingly, the user's UUID is included in the token request message. The user profile is then updated in the persistent data store. It is to be noted that the binding with the function node is already in place from the initial registration.

As depicted in FIG. 10, the process first entails a key negotiation between the client device and the registrar via the relay and proxy node. Second, token request/response messages are exchanged between the client device and the registrar, again via the relay and proxy node. The token request contains the UUID and the new e-mail address. Upon receipt of the UUID and new e-mail address, the registrar performs a lookup of the UUID and e-mail address in the persistent data store and determines that the e-mail is new. An e-mail token response is also sent back to the client device (i.e. to its new e-mail address) via the e-mail service, enterprise server and relay, as shown in FIG. 10. Upon receipt of the e-mail token response, the device replies back to the registrar with an authentication message to authenticate the user as being the rightful owner of the e-mail address. Once authenticated, the registrar updates the user's profile in the persistent data store by storing the new e-mail address in association with the UUID.

Switching to a New Device

Occasionally, a user will switch devices (e.g. upgrade his or her mobile device to a newer model). There are two key scenarios to cover for switching of devices.

Figure 11:
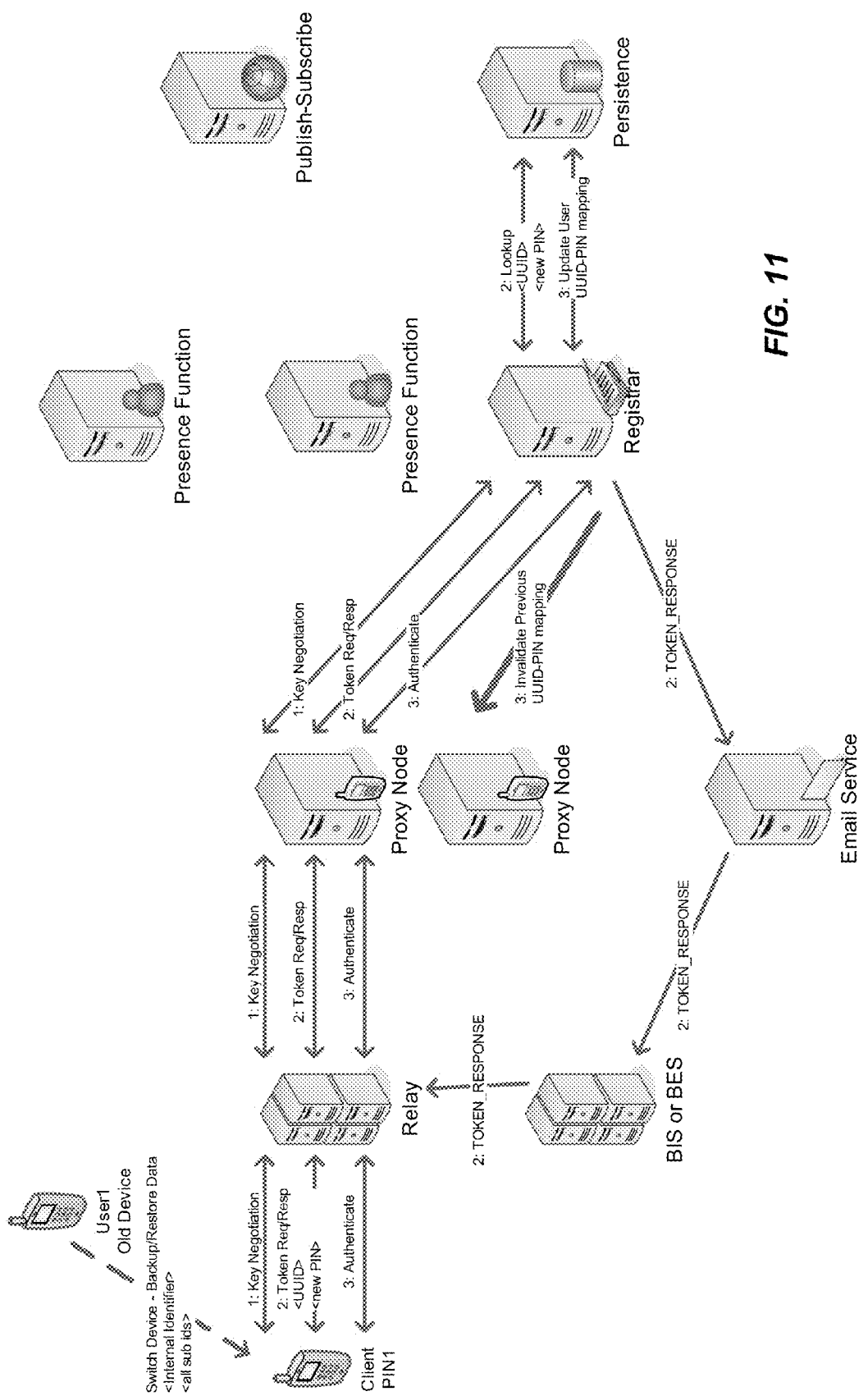
FIG. 11 schematically depicts a message flow for a backup/restore procedure when a user switches devices.

In a first scenario, an up-to-date (fresh) copy of the old device's data is copied to the new device via a backup/restore procedure. FIG. 11 schematically depicts a message flow for a backup/restore procedure when a user switches devices. Following the backup/restore procedure, the new device possesses all of the necessary data to resume normal operation with the presence service. User1 may then re-run the presence registration procedure (key negotiation, token request/response, and authentication) to update the UUID-mobile device identifier mapping in the persistent data store, as shown in FIG. 11. The procedure is similar to the new registration scenario except that, in this case, the new device includes the user's UUID in the token request/response procedure to inform the presence service that the user is already a registered user.

In this example, switching to a new mobile device causes the UUID-mobile device identifier mapping table maintained in the proxy node caches to become invalid. Upon completion of the switched device re-registration procedure, the registration node sends a system message to all proxy nodes instructing them to remove their cached entries for the UUID-mobile device identifier mapping if one exists. The next time the presence service sends a message to the client the proxy node responsible for routing the message will retrieve the new UUID-mobile device identifier mapping from the persistent data store.

In a second scenario, a current backup of the data from the old device may not be available. This might happen if the old device were lost or damaged.

Figure 12:
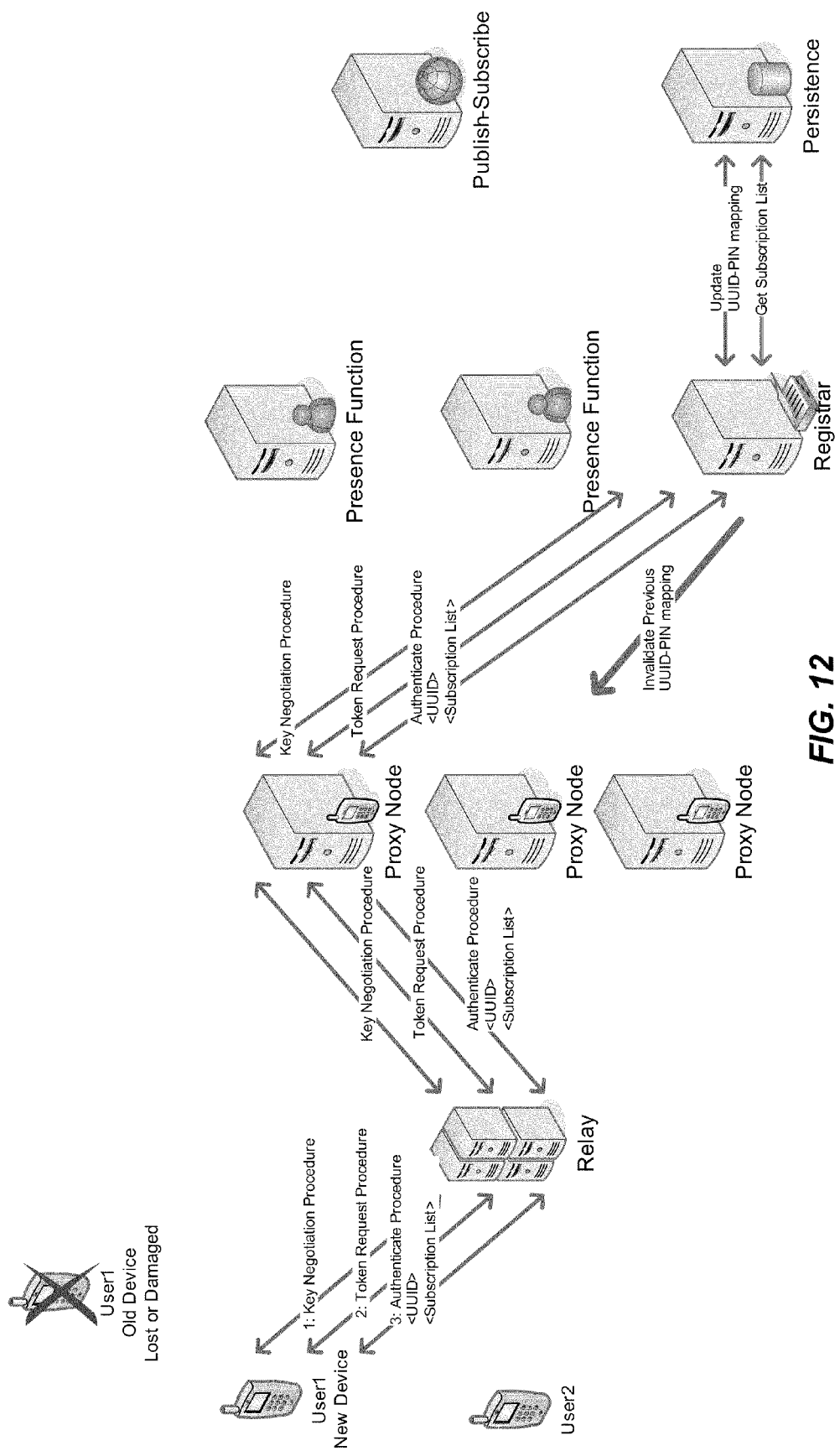
FIG. 12 schematically depicts a message flow for a re-registration process when a user switches devices but a current backup of the data from the old device is unavailable.

FIG. 12 schematically depicts a message flow for a re-registration process when a user switches devices but a current backup of the data from the old device is unavailable. To resume operations with the presence service, the user does the following: (1) associates/links the e-mail address previously selected as the user identifier with the new device and (2) executes the presence registration procedure using the same e-mail address was previously selected as the user identifier. The presence registrar recognizes the user as having been previously registered and delivers the user's UUID and subscription list to the new device.

Specifically, the method of FIG. 12 involves first a key negotiation procedure whereby the client device (in this case, User1's device) negotiates a key with the registrar by communicating through the relay and proxy node. Subsequently, token request-response messages are exchanged with the registrar. The registrar discovers that the UUID-PIN mapping (UUID-mobile device identifier mapping) is now invalid and sends a message to the proxy nodes to invalidate the previous UUID-PIN mapping. The registrar updates the UUID-PIN mapping in the persistence tier and gets the subscription list from the persistence tier. The UUID and subscription list are then sent back to the client device via the proxy node and relay.

Figure 13:
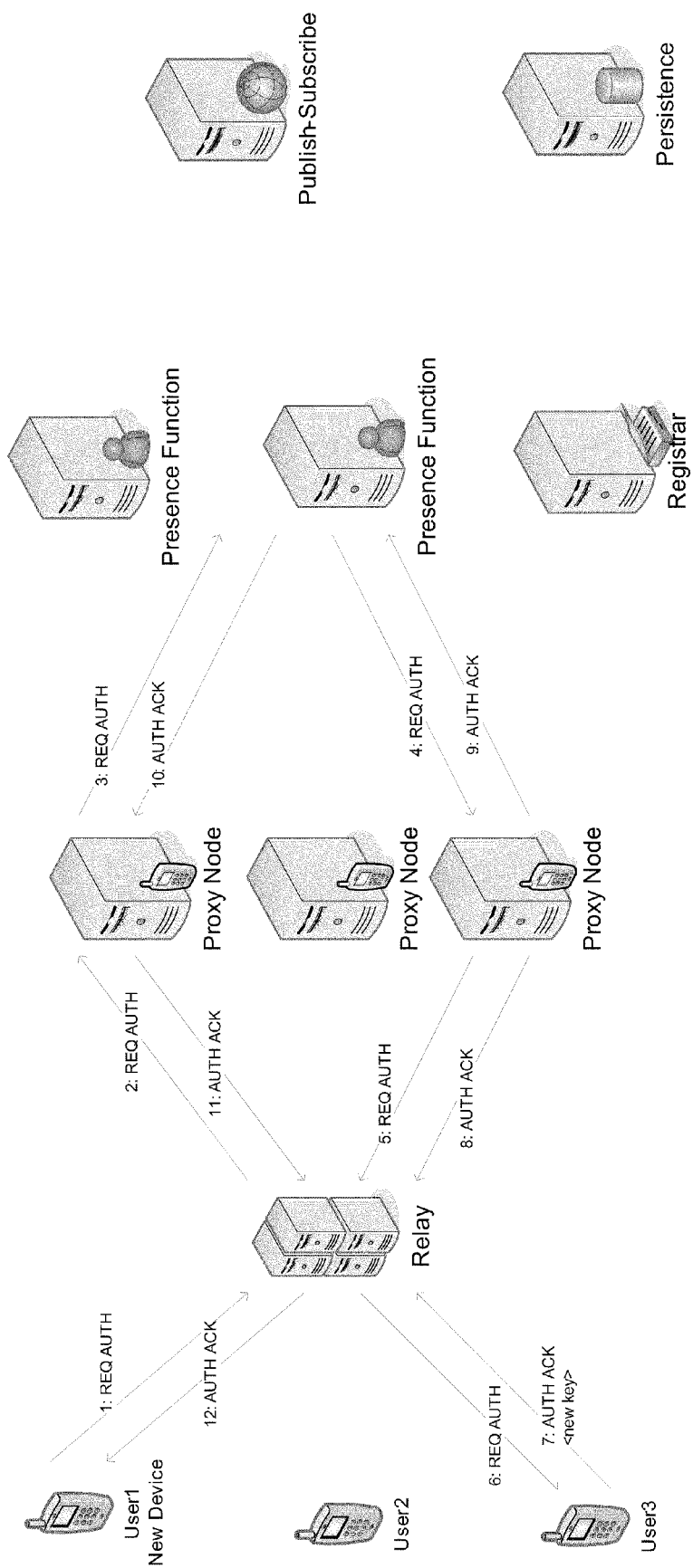
FIG. 13 schematically depicts a message flow when a user, upon switching devices and re-registering, requests re-authorization and new keys from each contact.

FIG. 13 schematically depicts a message flow when a user, upon switching devices and re-registering, requests re-authorization and new keys from each contact.

Using the subscription list obtained from the re-registration procedure, the user may request re-authorization and new keys from each contact. Existing subscriptions are in place and active so there is no need to create new subscriptions or to modify existing subscriptions. If authorization is not granted then subscriptions should be removed to avoid receiving unwanted notifications.

Specifically, the method of FIG. 13 involves sending a request for re-authorization [1:REQ AUTH] to the relay which forwards the request [2:REQ AUTH] to the proxy node which, in turn, forwards the request [3:REQ AUTH] to the function node to which the client device was previously bound. The function node communicates the request [4:REQ AUTH] to a different proxy node which forwards the request [5:REQ AUTH] to the relay (or possibly to a different relay). The relay transmits the request for re-authorization [6:REQ AUTH] to the contact (User3 in this example). User3 then replies with an authorization acknowledgement [7:AUTH ACK] containing a new key. The relay forwards the authorization acknowledgement [8:AUTH ACK] to the proxy node which, in turn, forwards the authorization acknowledgement [9:AUTH ACK] to the function node. As shown in FIG. 13, the function node then communicates the authorization acknowledgement [10:AUTH ACK] containing the new key from User3 to the proxy node with which User1 is communicating. The proxy node then passes the authorization acknowledgement [11:AUTH ACK] to the relay which transmits the authorization acknowledgement [12:AUTH ACK] containing User3's key to User1's client device.

The next step is to revoke authorization and encryption keys that have been given to other contacts. This will trigger or incite those contacts to request re-authorization and to obtain new keys as shown in FIG. 14.

Figure 14:
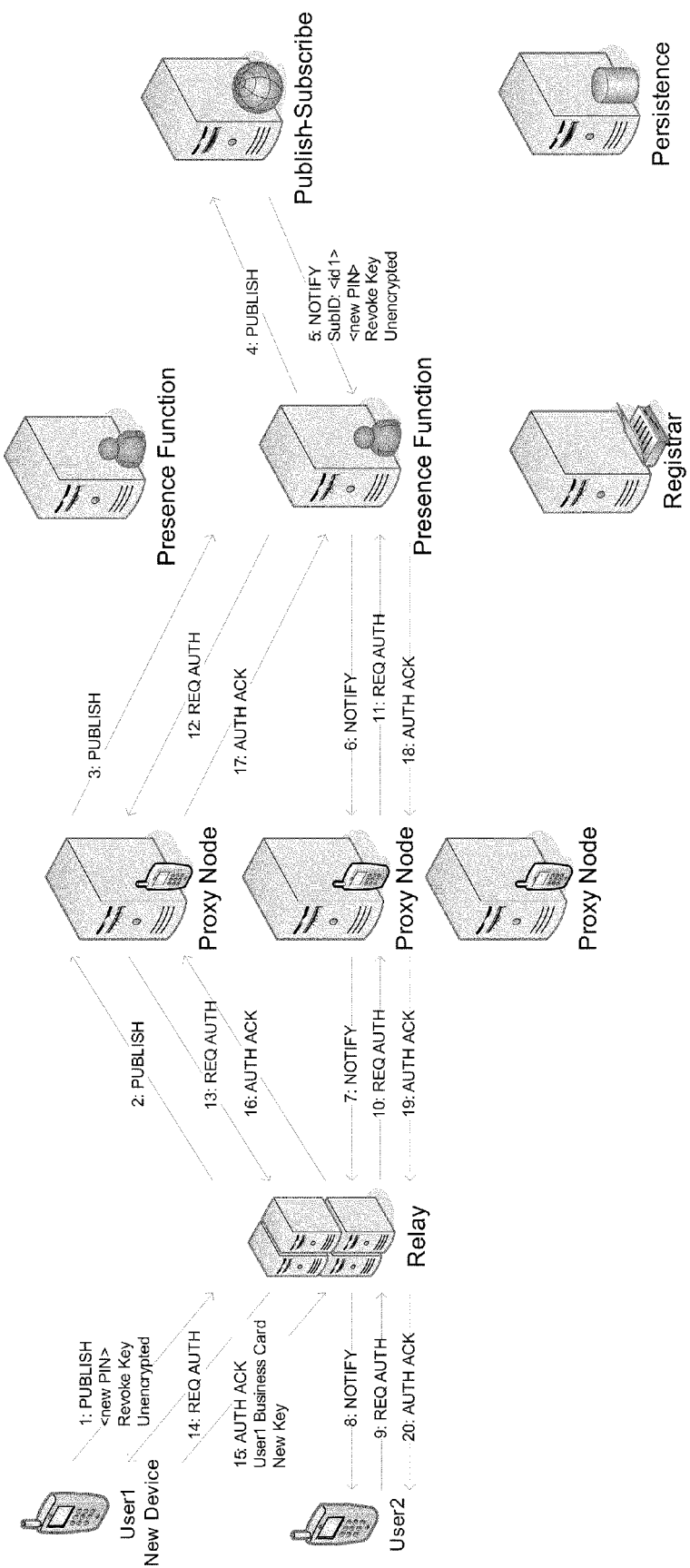
FIG. 14 schematically depicts a message flow when a user, upon switching devices, revokes and re-issues keys to all watchers.

FIG. 14 schematically depicts how keys can be revoked and then reissued to various watchers when a user switches devices. A message that is specifically formatted to match the subscription criteria of subscribed contacts is published. Since User1's device no longer knows the keys that were previously shared with the subscribed contacts, the message cannot be encrypted. The message contains User1's user identifier (i.e., e-mail address), the mobile device identifier of User1's new device and an indication that previously shared keys are revoked.

All subscribed contacts will receive notifications containing the message from User1. If the subscribed contact so wishes, they may request re-authorization and new keys from User1.

Specifically, the method of FIG. 14 involves publishing an unencrypted message [1:PUBLISH] to revoke one or more keys previously given to watchers (contacts). The relay forwards the message [2:PUBLISH] to the proxy node which forwards the message [3:PUBLISH] to the function node. The function node communicates the message [4:PUBLISH] to the publish-subscribe router/subsystem. The publish-subscribe router/subsystem revokes the key to cancel (disable) the subscription. The publish-subscribe subsystem then sends a notification message [5:NOTIFY] to the function node notifying that the key has been revoked (and that the subscription has been terminated) along with an indication of User1's new PIN (new mobile device identifier). The function node forwards the notification message [6:NOTIFY] to a proxy node with which User2's client was communicating. The proxy node sends the notification message [7:NOTIFY] to the relay which, in turn, sends the notification message [8:NOTIFY] to the device belonging to User2 to notify the latter that his key has been revoked by User1, thus terminating his subscription, and that User1 now has a new device with a new PIN (new mobile device identifier).

Upon receipt of this notification, User2 is incited to request a new authorization and a new key. A new authorization message [9:REQ AUTH] is communicated to the relay which forwards the authorization message [10:REQ AUTH] to the proxy node with whom User2's device is communicating. The proxy node forwards the authorization message [11:REQ AUTH] to the function node. The function node then transmits the authorization message [12:REQ AUTH] to the proxy node associated with User1's device. This proxy node then communicates the authorization message [13:REQ AUTH] to the relay which, in turn, communicates the authorization message [14:REQ AUTH] to User1's new device. User1's device then replies with an authorization acknowledgement [15:AUTH ACK] containing a new key. The authorization acknowledgement [16:AUTH ACK] is forwarded by the relay to the proxy node. The authorization acknowledgement [17:AUTH ACK] is then forwarded by the proxy node to the function node. The function node then communicates the authorization acknowledgement [18:AUTH ACK] to the proxy node associated with User2. This proxy node then forwards the authorization acknowledgement [19:AUTH ACK] to the relay which, in turn, forwards the authorization acknowledgement [20:AUTH ACK] to User2's device.

Registration with the presence system may be accomplished using any networked computing device or communications device, including personal computers, laptops, tablets, wireless communications devices (including PDAs, smart phones, cell phones, or any other type of mobile phone). Although the presence service can be used with a static computing device, it has particular synergy when utilized in conjunction with mobile devices or wireless communications devices that are equipped with location-determining subsystems such as, for example, Global Positioning System (GPS) receivers as this provides location-based presence information.

Figure 15:
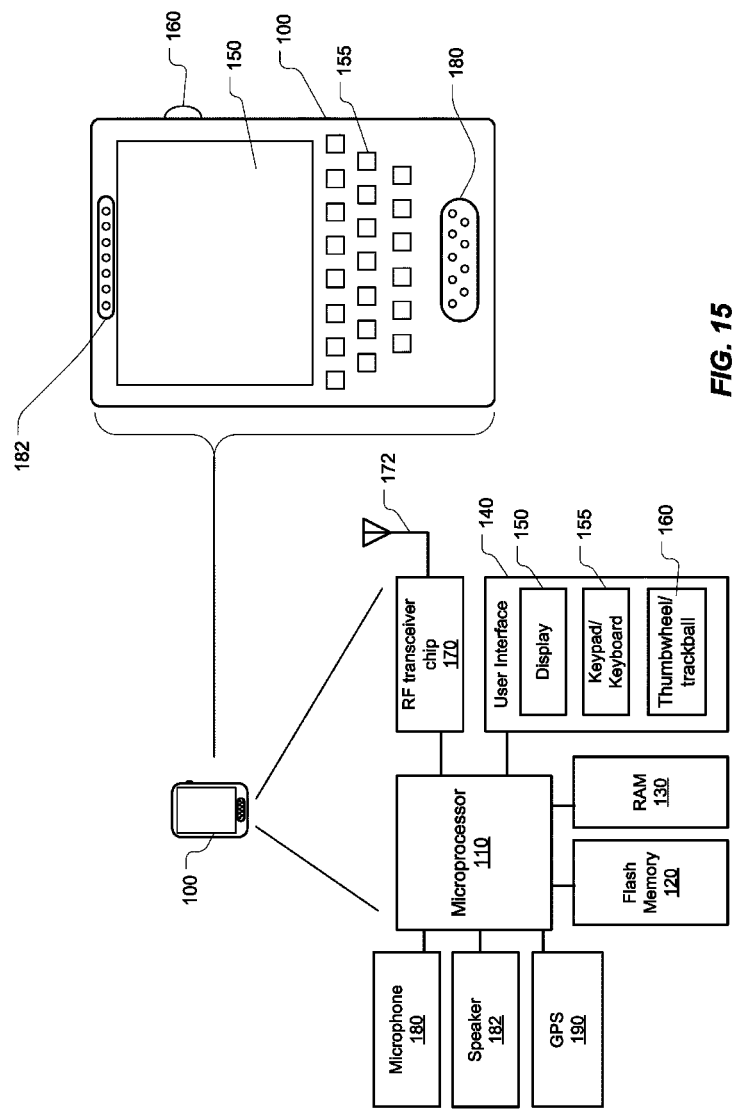
FIG. 15 is a schematic depiction of a wireless communications device having a registration client for registering with the presence system.

FIG. 15 depicts schematically an exemplary wireless communications device 100 which can be used to register with the presence service. For the purposes of this specification, the expression "wireless communications device" is meant to encompass a broad range of electronic communication devices that have processors and memory and which are capable of wireless ("over-the-air") communication. Accordingly, "wireless communications device" is meant to encompass wireless-enabled laptops, tablet PCs, portable, handheld or mobile electronic devices such as smart phones, cell phones, satellite phones, and wireless-enabled PDA's, etc., or any hybrid or multifunction device that has a radio-frequency (RF) transceiver.

Referring to FIG. 15, the wireless communications device 100 includes a microprocessor 110 or central processing unit (or simply a "processor") and a memory for storing data. The memory may include both a Flash memory 120 and a random access memory (RAM) 130. Each wireless communications device 100 also has a user interface 140 that includes a display (graphical user interface—GUI) 150, e.g. an LCD screen, a keyboard/keypad 155 and an optional thumbwheel/trackball 160. Alternatively, the user interface may include a touchscreen. Each wireless communications device 100 includes an RF transceiver chip 170 for wireless communications, i.e. receiving and transmitting both voice and data over separate channels. For voice communications, the wireless communications device 100 has a microphone 180 and a speaker 182. In addition, as shown schematically in FIG. 15, the wireless communications device 100 may include a Global Positioning System (GPS) chipset for obtaining position fixes from orbiting GPS satellites. References to GPS are meant to also include Assisted GPS or Aided GPS. "Global Positioning System" or "GPS" is meant to include any satellite-based navigation-signal broadcast system. Other position-determining subsystems may be used in lieu of, or to supplement, the GPS coordinates, such as triangulation of signals from in-range base towers, using the identity of the nearest base station, etc. The processor of the wireless communications device 100 may thus execute a presence registration client programmed to interact with a radiofrequency transceiver on the device to negotiate a key with a registrar of the presence service in order to establish an encrypted communications channel between the device and the registrar and to authenticate a user of the device with the registrar by exchanging messages through the encrypted communications channel and through a separate e-mail channel to thereby enable the registrar to create a user profile for the user and to bind the client device with one particular function node of the presence service for subsequently exchanging presence data. The presence registration client application (or simply registration client application) may be subsumed within a presence client application on the device or it may be a distinct application.

The methods disclosed in the present specification can be implemented as coded instructions in a machine-readable medium, computer-readable medium or computer program product which stores software code to perform the foregoing methods when loaded into memory and executed on the microprocessor of one or more computing devices.

This new technology has been described in terms of specific implementations and configurations which are intended to be exemplary only. The scope of the exclusive right sought by the Applicant is therefore intended to be limited solely by the appended claims.

The invention claimed is:

1. A method of registering a wireless communications device with a presence system, the method comprising:
    negotiating a key with a registrar in order to establish an encrypted communications channel between the wireless communications device and the registrar via a proxy node;
    transmitting a token request over the encrypted communications channel from the wireless communications device to the registrar, the token request including an e-mail address associated with the wireless communications device;
    receiving at the wireless communications device (i) a token response from the registrar via the encrypted communications channel and (ii) an e-mail token from the registrar via a separate email channel using the e-mail address included in the token request, wherein the token response includes first security information and the e-mail token includes second security information;
    transmitting an authentication message from the wireless communication device to the registrar via the encrypted communications channel, the authentication message including a combination of the first and second security information;
    receiving at the wireless communication device via the encrypted communications channel an authentication acknowledgement from the registrar containing a universally unique identifier; and
    using the universally unique identifier for subsequently exchanging presence data between the wireless communications device and the presence system.

2. The method as claimed in claim 1 further comprising:
    transmitting a new token request from a new device having a new mobile device identifier, the token request comprising the e-mail address used in association with the wireless communications device previously used by the user; and
    receiving from the registrar the universally unique identifier and a subscription list stored in the persistent data store.

3. The method as claimed in claim 2 further comprising revoking the authorization and key for each contact, thus inciting each contact to request re-authorization and to obtain a new key.

4. A wireless communications device for registering with a presence service, the device comprising:
    a processor coupled to memory for executing a presence registration client, the presence registration client being programmed to interact with a radiofrequency transceiver on the wireless communications device to:
    negotiate a key with a registrar of the presence service in order to establish an encrypted communications channel between the wireless communications device and the registrar;
    transmit a token request over the encrypted communications channel from the wireless communications device to the registrar, the token request including an e-mail address associated with the wireless communications device;
    receive (i) a token response from the registrar via the encrypted communications channel and (ii) an e-mail token from the registrar via a separate email channel using the e-mail address included in the token request, wherein the token response includes first security information and the e-mail token includes second security information;
    transmit an authentication message to the registrar via the encrypted communications channel, the authentication message including a combination of the first and second security information;
    receive via the encrypted communications channel an authentication acknowledgement from the registrar containing a universally unique identifier; and
    use the universally unique identifier for subsequently exchanging presence data between the wireless communications device and the presence service.

5. A non-transitory machine-readable medium comprising code which when loaded into memory and executed on a processor of a wireless communications device is programmed to cause the device to:
    negotiate a key with a registrar of the presence service in order to establish an encrypted communications channel between the wireless communications device and the registrar; and
    transmit a token request over the encrypted communications channel from the wireless communications device to the registrar, the token request including an e-mail address associated with the wireless communications device;
    receive (i) a token response from the registrar via the encrypted communications channel and (ii) an e-mail token from the registrar via a separate email channel using the e-mail address included in the token request, wherein the token response includes first security information and the e-mail token includes second security information;

transmit an authentication message to the registrar via the encrypted communications channel, the authentication message including a combination of the first and second security information;

receive via the encrypted communications channel an authentication acknowledgement from the registrar containing a universally unique identifier; and use the universally unique identifier for subsequently exchanging presence data between the wireless communications device and the presence service.

6. The method of claim 1, wherein the wireless communication device automatically combines the first and second security information to generate the authentication message.

7. The wireless communication device of claim 4, wherein the wireless communication device automatically combines the first and second security information to generate the authentication message.

8. The non-transitory machine-readable medium of claim 5, wherein the wireless communication device automatically combines the first and second security information to generate the authentication message.

* * * * *